Figure 1:
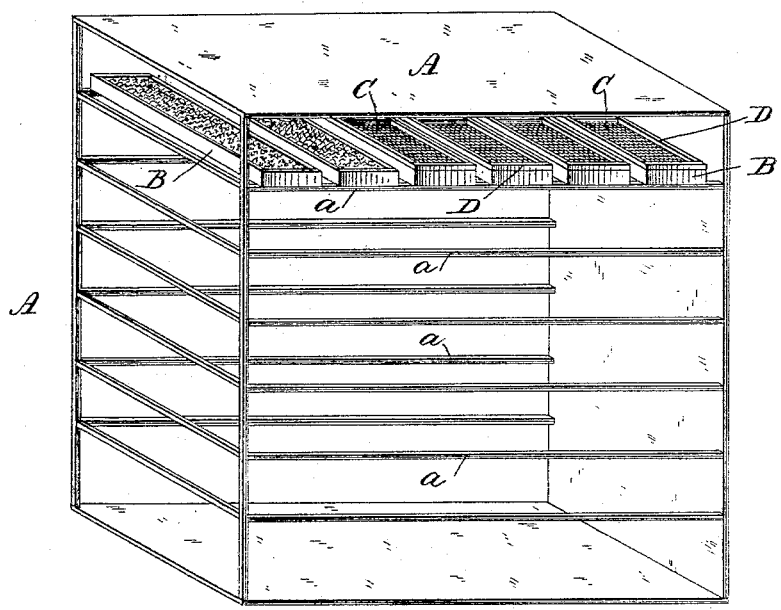

(No Model.)

R. JOHNSON.
DRYING STARCH.

No. 323,425. Patented Aug. 4, 1885.

Witnesses:
E. D. Smith
N. N. Low

Inventor:
Richard Johnson,
by J. H. Houghton.
Atty.

UNITED STATES PATENT OFFICE.

RICHARD JOHNSON, OF MADISON, INDIANA.

DRYING STARCH.

SPECIFICATION forming part of Letters Patent No. 323,425, dated August 4, 1885.

Application filed May 15, 1885. (No model.)

*To all whom it may concern:*

Be it known that I, RICHARD JOHNSON, a citizen of the United States, residing at Madison, in the county of Jefferson and State of Indiana, have invented certain new and useful Improvements in the Methods of Drying Starch; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improvement in the drying of starch, and has for its object the production of a starch of a quality superior in many respects to any which is made by the methods now used.

Heretofore the starch, at the proper and usual stage in its manufacture, has been openly exposed to the action of heat in a drying-room, kiln, or oven, or it has been placed in wholly or partially closed vessels, upon which latter the heated air chiefly acts, and through them upon the starch.

My invention relates to the latter method; but I do not claim, broadly, drying starch in a porous or partially-open vessel, as I am aware that has been heretofore practiced. I have discovered, however, by experiment that a textile fabric, when interposed between the starch to be dried and the heat-conveying air, has a highly beneficial effect upon the quality of the product. In such case the starch comes out in larger lumps and is harder, heavier, of better "body," and much whiter than when dried by the methods now in use. By this method, also, I partially or entirely avoid the crystallization of the starch. I attribute these beneficial results largely to the uniformity with which the textile, by its reticulations, distributes the heat upon the starch, also to the fact that while the openness of the interposed material permits the heat to pass through it with comparative freedom, it at the same time retains the moisture in the starch to a considerable degree.

Various materials may be used for the textile medium. Ordinary muslin or cloth of any kind, or wire-cloth, is suitable for the purpose.

The preferred way of applying the textile is to stretch it upon a light frame made to fit a tray adapted to hold the starch to be dried. A suitable quantity of the undried starch having been placed in the tray and covered with the textile frame, it is placed in a dry-room and there exposed for a proper length of time, depending upon its wetness and the degree of heat.

In order to make my invention more clearly understood, I have shown in the accompanying drawings a means for carrying it into effect.

Figure 2:
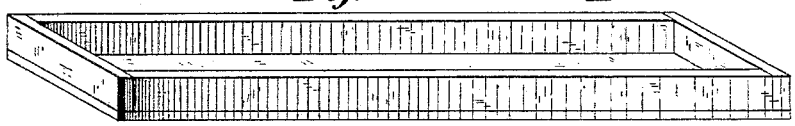
Figure 3:
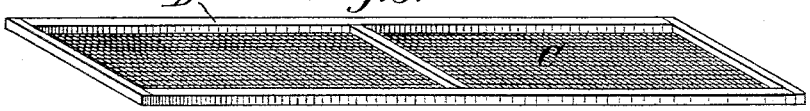

In said drawings, Figure 1 is a perspective view of a rack and tray for drying starch according to my invention. Fig. 2 is a view of one of the trays. Fig. 3 is a view of the textile cover.

A is a rack in a dry room or oven, or otherwise suitably situated for the application of heat, and having supports $a$ adapted to hold trays B.

C represents the textile stretched upon a light frame, D, of suitable material, preferably poplar.

The trays B are supplied with the proper quantity of starch, as indicated at $x$, covered with the textile frames, and are placed in the rack A. Heat is then supplied, as by a steam-heating apparatus, for the proper length of time.

I am aware that hops have been dried in trays having a reticulated bottom, and that fruit has been dried in a wheel having fruit-holding sections provided with reticulated bottoms and covers, and I do not wish to be understood as claiming such devices.

What I claim, and desire to secure by Letters Patent of the United States, is—

1. The herein-described method of drying starch, consisting in exposing the same to the action of heat through a textile or reticulated medium, substantially as set forth.

2. The herein-described starch-drying receptacle consisting of the combination, with a suitable holder for the starch having an imperforate bottom, of the frame D and textile C, substantially as set forth.

In testimony whereof I affix my signature in presence of two witnesses.

RICHARD JOHNSON.

Witnesses:
 M. D. WILSON,
 JNO. JOHNSON.